B. E. THOMPSON.
AUTOMOBILE HOOD.
APPLICATION FILED OCT. 26, 1912.
1,104,942.
Patented July 28, 1914.
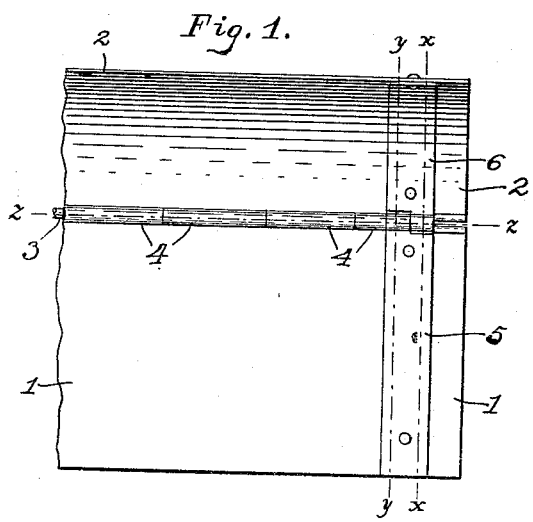
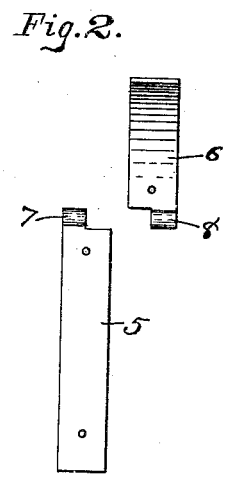
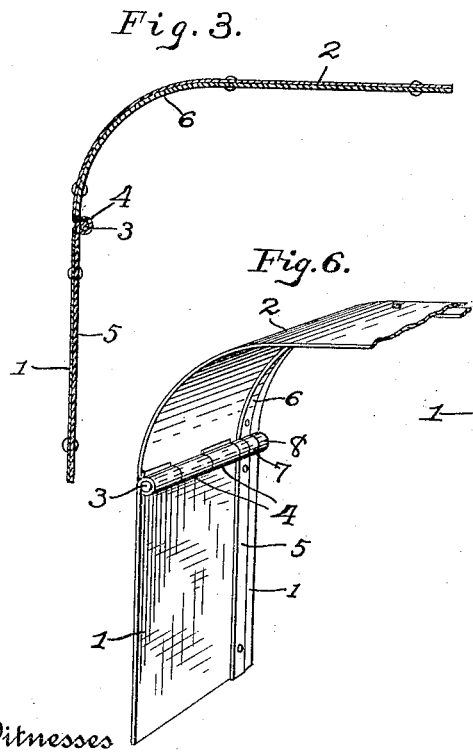
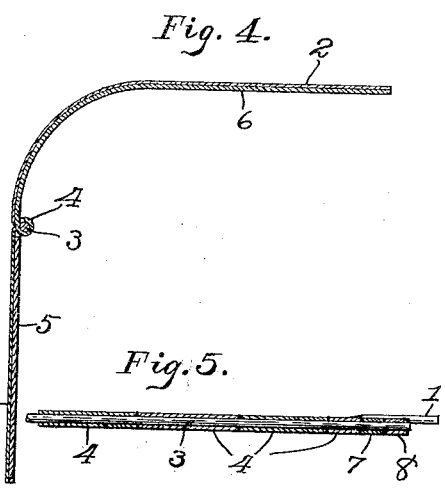
Witnesses
Chas. N. Leonard.
A. S. Pike.
Inventor
Bert E. Thompson
by Bradford & Doolittle
Attorneys

UNITED STATES PATENT OFFICE.

BERT E. THOMPSON, OF INDIANAPOLIS, INDIANA.

AUTOMOBILE-HOOD.

1,104,942.  Specification of Letters Patent.  Patented July 28, 1914.

Application filed October 26, 1912. Serial No. 727,854.

*To all whom it may concern:*

Be it known that I, BERT E. THOMPSON, a citizen of the United States, residing at Indianapolis, Marion county, and State of Indiana, have invented and discovered certain new and useful Improvements in Automobile-Hoods, of which the following is a specification.

My invention relates to automobile hoods and its object is to provide means for strengthening the hinged hood sections, particularly at their hinge junction.

To this end my invention is embodied in preferable form in the device hereinafter described and illustrated in the accompanying drawings.

In these drawings, Figure 1 is an interior side view in elevation of a portion of a hood showing a part of two sections thereof and the hinge connecting the same; Fig. 2, a detail side view in elevation of the stays separated from the hood; Fig. 3, a longitudinal section on the line $x$—$x$ of Fig. 1; Fig. 4, a longitudinal section on the line $y$—$y$ of Fig. 1; Fig. 5, a section on the line $z$—$z$ of Fig. 1; and Fig. 6, a perspective end view of one-half of the hood.

Referring to the drawings, 1 is the lower section of an automobile hood and 2 the upper section thereof. These sections as is customary are joined by a horizontally extending hinge. In the present case this hinge is formed, in main part, of a pintle 3, and knuckles 4 formed by ears integral with the sheet metal section and projecting from the edges thereof. The opposite knuckles of the hood sections engage the pintle in alternate order. Stiffening stays 5, 6 are secured to the respective sections 1 and 2, and extend vertically of such sections. In my invention these stays are prolonged beyond their usual point of termination and have their ends turned over and formed into knuckles 7, and 8, respectively that engage the pintle near one end of the latter. These stays thus serve not only to strengthen and stiffen the hood sections throughout their body sections but also to materially strengthen the hinge.

It will be seen that the knuckles 7 and 8 of the respective sections are each one-half the width of the stay, being thus formed by cutting away half the width at the end and leaving the other half which is bent up to form a knuckle adapted to receive the pintle. By this arrangement the alinement of the two stays is preserved and also the knuckles 7 and 8 serve to brace one another.

Having thus described my invention, what I claim is,

1. As an article of manufacture, an automobile hood having hinged sections and stays extending across the sections and both having their inner ends formed into knuckle members lying side by side engaging the pintle of the hinges, substantially as described.

2. As an article of manufacture, an automobile hood having two sections hinged together, a stay secured to and conforming to each section, each of said stays having its inner edge curved to form eyes, said eyes adapted to lie side by side, the knuckles of said hinge being formed by the bent and curved edges of said sections and stays, substantially as described.

3. As an article of manufacture, an automobile hood having two sections each having a stay secured thereto, said stays being arranged in alinement and each stay having a portion thereof terminating at or within the edge of the section and the other portion thereof continued into a curved member adapted to form a knuckle to receive a hinge pintle, the said members of the respective stays being disposed on opposite edges of the stays and out of alinement whereby the knuckles formed by said member will be disposed side by side with respect to the pintle, substantially as described.

In witness whereof, I have hereunto set my hand and seal at Indianapolis, Indiana, this 23d day of September, A. D. nineteen hundred and twelve.

BERT E. THOMPSON. [L. S.]

Witnesses:
H. P. DOOLITTLE,
LYDIA W. VENN.

Copies of this patent may be obtained for five cents each, by addressing the "Commissioner of Patents, Washington, D. C."